(12) United States Patent
Seo et al.

(10) Patent No.: US 11,436,918 B2
(45) Date of Patent: *Sep. 6, 2022

(54) REMOTE CONTROL APPARATUS AND CONTROL METHOD THEREOF

(71) Applicant: SAMSUNG ELECTRONICS CO., LTD., Suwon-si (KR)

(72) Inventors: Jehwan Seo, Suwon-si (KR); Minsup Kim, Suwon-si (KR); Kihyun Song, Suwon-si (KR); Sukhoon Yoon, Suwon-si (KR); Jongkeun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/357,330

(22) Filed: Jun. 24, 2021

(65) Prior Publication Data

US 2021/0319689 A1 Oct. 14, 2021

Related U.S. Application Data

(63) Continuation of application No. 16/557,394, filed on Aug. 30, 2019, now Pat. No. 11,074,808.

(30) Foreign Application Priority Data

Oct. 17, 2018 (KR) .................. 10-2018-0123824

(51) Int. Cl.
*H04B 10/00* (2013.01)
*G08C 23/04* (2006.01)
(Continued)

(52) U.S. Cl.
CPC ............. *G08C 23/04* (2013.01); *G08C 17/02* (2013.01); *H04L 61/5076* (2022.05);
(Continued)

(58) Field of Classification Search
CPC .... G08C 23/04; G08C 17/02; G08C 2201/21; G08C 2201/32; G08C 2201/92;
(Continued)

(56) References Cited

U.S. PATENT DOCUMENTS

2010/0013695 A1  1/2010  Hong et al.
2011/0080120 A1* 4/2011  Talstra .................. H05B 47/19
                                                340/9.1
(Continued)

FOREIGN PATENT DOCUMENTS

JP   2006-318329 A   11/2006
JP     4627284 B2     2/2011
(Continued)

OTHER PUBLICATIONS

Communication (PCT/ISA/210) dated Dec. 18, 2019 by the International Searching Authority in counterpart International Patent Application No. PCT/KR2019/011365.
(Continued)

*Primary Examiner* — Hibret A Woldekidan
(74) *Attorney, Agent, or Firm* — Sughrue Mion, PLLC

(57) ABSTRACT

A remote control apparatus is provided. The remote control apparatus includes a directional antenna, a communicator, and a processor configured to, based on a wireless signal being received from an external device through the directional antenna, identify an angle at which the wireless signal is received, based on the angle being within a predetermine range, obtain identification information of the external device by parsing the wireless signal, based on the identification information, identify whether the external device is registered to a server and based on identifying that the external device is not registered to the server, transmit a signal for requesting registration to the external device through the communicator.

16 Claims, 15 Drawing Sheets

(51) Int. Cl.
*H04W 60/04* (2009.01)
*G08C 17/02* (2006.01)
*H04L 61/5076* (2022.01)
*H04L 67/125* (2022.01)
*H04L 101/622* (2022.01)

(52) U.S. Cl.
CPC ........ *H04W 60/04* (2013.01); *G08C 2201/21* (2013.01); *G08C 2201/32* (2013.01); *G08C 2201/92* (2013.01); *H04L 67/125* (2013.01); *H04L 2101/622* (2022.05)

(58) Field of Classification Search
CPC ............ G08C 2201/91; G08C 2201/93; G08C 2201/50; G08C 2201/61; H04L 61/2076; H04L 61/6022; H04L 67/125; H04W 60/04; H04W 88/085; H04W 12/06; H04B 5/0031; H04B 5/0062; H04B 10/1143; H04B 10/40; H04N 21/41265
USPC ................. 398/106, 107, 114, 115, 135, 138
See application file for complete search history.

(56) References Cited

U.S. PATENT DOCUMENTS

| | | | |
|---|---|---|---|
| 2014/0136633 A1* | 5/2014 | Murillo, Jr. | H04L 51/24 709/206 |
| 2015/0070142 A1 | 3/2015 | Miki et al. | |
| 2016/0012718 A1 | 1/2016 | Yoshida et al. | |
| 2017/0162036 A1 | 6/2017 | Agardh et al. | |
| 2017/0308248 A1 | 10/2017 | Choi et al. | |

FOREIGN PATENT DOCUMENTS

| | | |
|---|---|---|
| JP | 2013-211696 A | 10/2013 |
| JP | 2013-236191 A | 11/2013 |
| KR | 10-2010-0056193 A | 5/2010 |
| KR | 10-1233783 B1 | 2/2013 |
| KR | 10-1236209 B1 | 2/2013 |
| KR | 10-1653656 B1 | 9/2016 |
| KR | 10-2016-0144156 A | 12/2016 |
| WO | 2016/060371 A1 | 4/2016 |

OTHER PUBLICATIONS

Communication (PCT/ISA/237) dated Dec. 18, 2019 by the International Searching Authority in counterpart International Patent Application No. PCT/KR2019/011365.

Communication (Search Report) dated Mar. 2, 2020 by the European Patent Office in counterpart European Patent Application No. 19194663.1.

Communication dated Jun. 9, 2021 by the European Patent Office in counterpart European Patent Application No. 21159028.6.

Communication (First Examination Report) dated Feb. 22, 2022 by Intellectual Property India in counterpart Indian Patent Application No. 202117020656.

* cited by examiner

FIG. 8
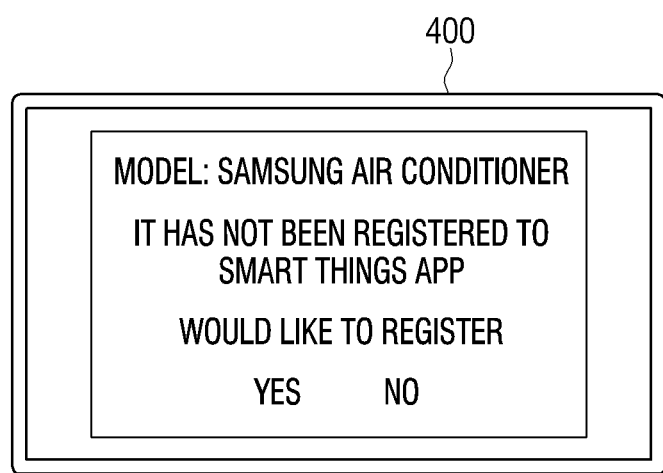
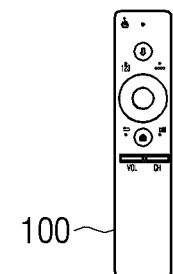

FIG. 9
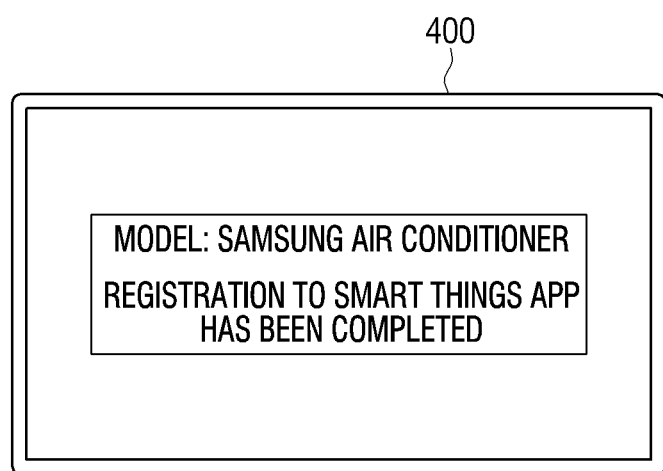
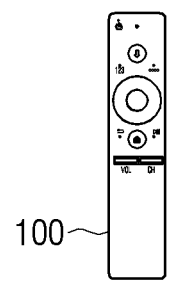

FIG. 10
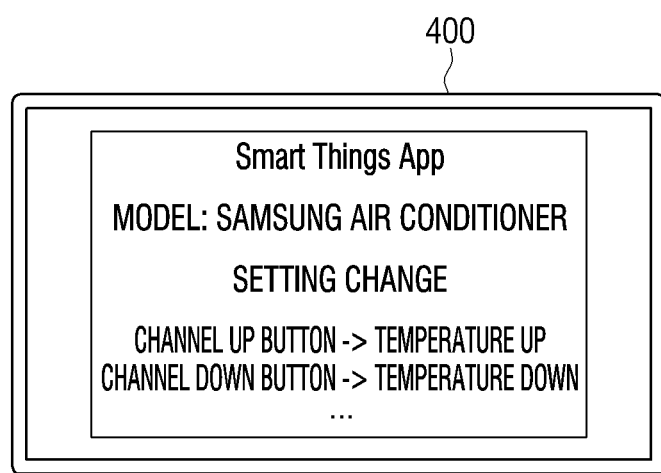
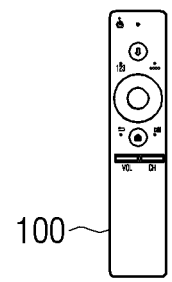

REMOTE CONTROL APPARATUS AND CONTROL METHOD THEREOF

CROSS-REFERENCE TO RELATED APPLICATIONS

This application is a Continuation Application of U.S. application Ser. No. 16/557,394, filed on Aug. 30, 2019, which claims priority from Korean Patent Application No. 10-2018-0123824, filed on Oct. 17, 2018, in the Korean Intellectual Property Office, the disclosure of which is incorporated herein by reference in its entirety.

BACKGROUND

1. Field

Devices and methods consistent with what is disclosed herein relate to a remote control apparatus and a controlling method thereof, and more particularly, to a remote control apparatus enabling intuitively registering a device to be controlled and a controlling method thereof.

2. Description of the Related Art

With the development of semi-conductor technology and wireless communication technology, various technology developments are ongoing. Specifically, an Internet of Things (IoT) technology has been developed for transmitting and receiving data between Things in real time.

The Internet of Things may be evolved from Ubiquitous Sensor Network (USN) or Machine to Machine (M2M), and be characterized by connecting things equipped with a communication function, thereby enabling intercommunication between them.

Through the Internet of things technology, a user may easily control IoT devices without limitation on time and a place.

Meanwhile, in order to user the IoT technology, a procedure is required to register things to an IoT related application or a server managing the IoT related application.

Conventionally, an application of a smart phone was used for registering things. To be specific, a user executes an application for registering things, retrieves nearby things, selects a thing the user wish to register among registerable things in a list, and registers the thing to a server.

However, a user may feel bothersome when a plurality of user inputs are required.

In addition, when things of the same name are included in the list of the registerable things, it requires a thing's own unique identification number, which causes user inconvenience.

SUMMARY

An aspect of the embodiments relates to a remote control apparatus enabling registration of a device to be controlled through an intuitive and simplified registration process.

According to an embodiment, a remote control apparatus includes a directional antenna, a communicator, and a processor configured to, based on a wireless signal being received from an external device through the directional antenna, identify an angle at which the wireless signal is received, based on the angle being within a predetermined range, obtain identification information of the external device by parsing the wireless signal, based on the identification information, identify whether the external device is registered to a server, and based on identifying that the external device is not registered to the server, transmit a signal for requesting registration to the external device through the communicator.

The processor may be further configured to receive information on a device registered to the server from at least one of the server and an external electronic apparatus, and identify whether the external device is a device registered to the server based on the information on the device and the identification information.

The processor may be further configured to, based on a user input for registering the external device being received, identify the angle at which the wireless signal is received.

The apparatus may further include an IR transmitter, and the processor is further configured to, based on a user input for controlling the external device being received, transmit an IR signal corresponding to the user input to the external device through the IR transmitter, and identify the angle at which the wireless signal is received.

The identification information may include information on Mac address of the external device.

The directional antenna may include two parallel antennas, and the processor may be further configured to identify the angle at which the wireless signal is received based on a first signal and a second signal transmitted from the external device and reached the two parallel antennas.

The processor may be further configured to transmit the identification information to an external electronic apparatus for guiding registration of the external device.

According to an embodiment, a method for controlling a remote control apparatus includes receiving a wireless signal from an external device, identifying an angle at which the wireless signal is received, based on the angle being within a predetermined range, obtaining identification information of the external device by parsing the wireless signal, and based on identifying that the external device is not registered to a server based on the identification information, transmitting a signal for requesting registration to the external device.

The identifying may include receiving information on a device registered to the server from at least one of the server and an external electronic apparatus, and based on the information on the device and the identification information, identifying whether the external device is registered to the server.

The identifying may include, based on a user input for registering the external device being received, identifying the angle at which the wireless signal is received.

The identifying may include, based on a user input for controlling the external device being received, transmitting an IR signal corresponding to the user input to the external device, and identifying the angle at which the wireless signal is received.

The identification information may include information on Mac address of the external device.

The identifying may include identifying the angle at which the wireless signal is received based on a first signal and a second signal transmitted from the external device and reached two parallel antennas of the remote control apparatus.

According to an embodiment, a remote control system includes a remote control apparatus, and an electronic apparatus, and the remote control apparatus is configured to, based on a wireless signal being received from an external device, identify an angle at which the wireless signal is received, based on the angle being within a predetermined range, obtain identification information of the external device by parsing the wireless signal, and transmit the identification information to the electronic apparatus, and the electronic apparatus is further configured to, based on the identification information, identify whether the external device is registered to a server, and based on identifying that the external device is not registered to the server, transmit a signal requesting registration of the external device to the server.

The electronic apparatus may be further configured to identify whether the external device is registered to the server based on at least one of information on a device registered to the server which received from the server or pre-stored information on the device registered to the server, and the identification information.

The electronic apparatus may be further configured to transmit information on a device registered to the server to the remote control apparatus, the remote control apparatus is further configured to, based on identifying that the external device is not registered to the server based on the information on the device registered to the server received from the electronic apparatus or the identification information, transmit the signal requesting registration to the external device.

The electronic apparatus may be further configured to, identify an angle at which the identification information is received, and based on the angle being within a predetermined range, identify whether the external device is registered to the server based on the identification information.

The electronic apparatus may be further configured to, based on identifying that the external device is not registered to the server, display a user interface (UI) for guiding registration of the external device on a display of the electronic apparatus The electronic apparatus may be further configured to, based on information on registration completion of the external device being received from the server, display a message indicating the registration completion on a display of the electronic apparatus.

According to an embodiment, a non-transitory computer-readable recording medium having recorded thereon a program for performing a method for controlling a remote control apparatus is provided, and the method includes receiving a wireless signal from an external device, identifying an angle at which the wireless signal is received, based on the angle being within a predetermined range, obtaining identification information of the external device by parsing the wireless signal, and based on identifying that the external device is not registered to a server based on the identification information, transmitting a signal for requesting registration to the external device.

BRIEF DESCRIPTION OF THE DRAWINGS

FIG. 7, FIG. 8, FIG. 9, FIG. 10, and FIG. 11 are views to explain an operation of a remote control system according to an embodiment of the disclosure;

DETAILED DESCRIPTION OF EXAMPLE EMBODIMENTS

Before describing the disclosure in detail, a method of describing the specification and drawings will be described.

All the terms used in this specification including technical and scientific terms have the same meanings as would be generally understood by those skilled in the related art. However, these terms may vary depending on the intentions of the person skilled in the art, legal or technical interpretation, and the emergence of new technologies. In addition, some terms are arbitrarily selected by the applicant. These terms may be construed in the meaning defined herein and, unless otherwise specified, may be construed on the basis of the entire contents of this specification and common technical knowledge in the art.

In describing embodiments, detailed description of relevant known functions or components may be omitted if it would obscure the description of the subject matter.

The embodiment of the disclosure will be described in detail with reference to the following drawings and features in the enclosed drawings, but the features of the disclosure are not limited thereto.

Hereinafter, a remote control system and a controlling method of the remote control system according to embodiments will be described in detail with reference to the drawings attached hereto.

Figure 1:
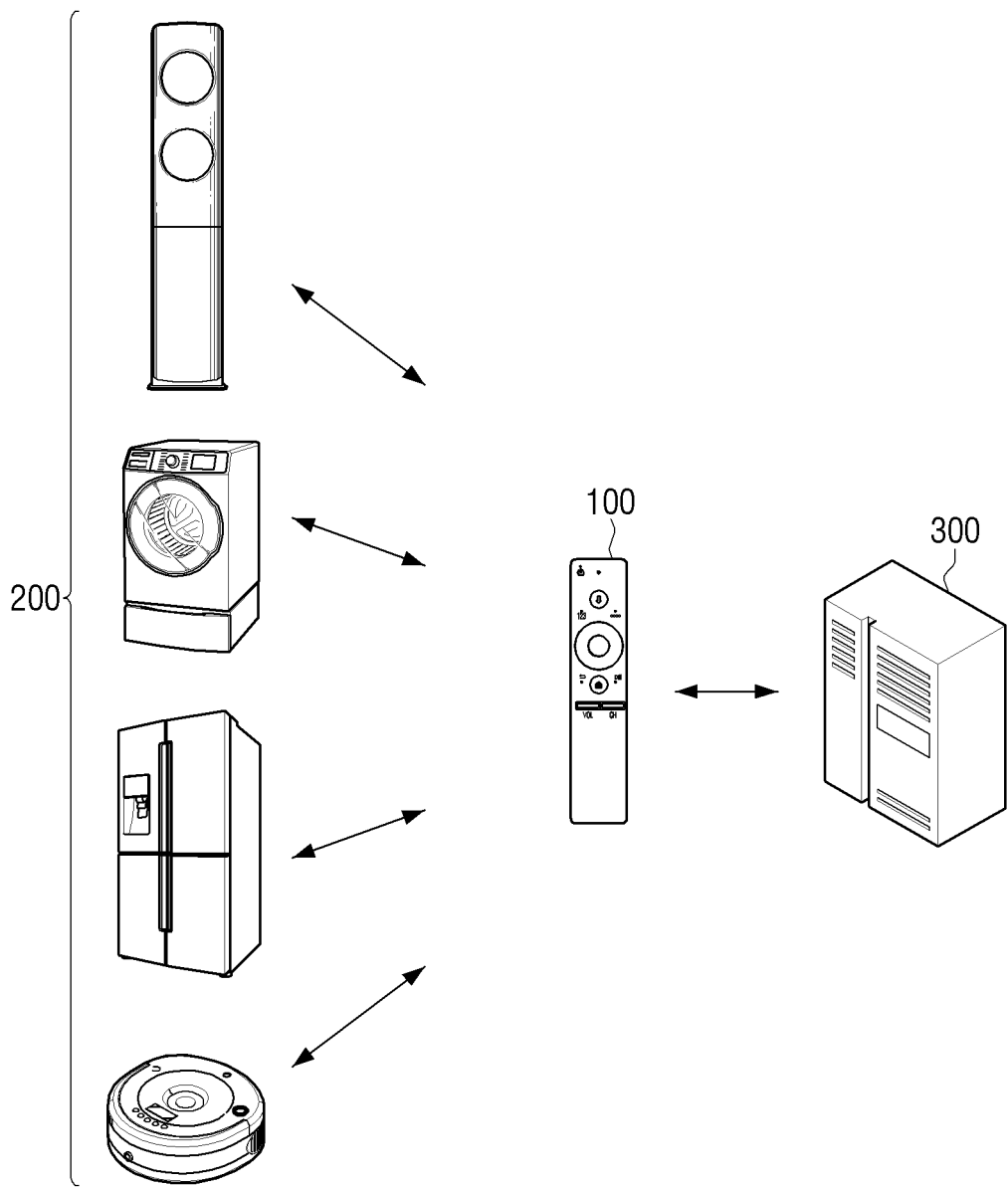
FIG. 1 is a view to explain a remote control system according to an embodiment of the disclosure.

FIG. 1 is a view to explain a remote control system according to an embodiment of the disclosure.

Referring to FIG. 1, a remote control system 10 according to an embodiment may include a remote control apparatus 100, an external device 200 and a server 300.

The remote control apparatus 100 may control the external device 200.

The remote control apparatus 100 may transmit an IR signal for controlling the external device 200 to the external device 200 through an IR transmitter to control the external device 200.

In addition, the remote control apparatus 100 may set a communication link with the external device 200 through a communication method such as Wi-Fi, ZigBee, Z-Wave or Bluetooth, and transmit a control signal to the external device 200 using wireless communication to control the external device 200.

The remote control apparatus 100 may set a communication link with the server 300 using a communication method such as Wi-Fi or mobile communication, and transmit the control signal to the server 300 using the wireless communication to control the external device 200. The server 300 may transmit the control signal received from the remote control apparatus 100 to the external device 200.

The remote control apparatus 100, the external device 200 and the server 300 may communicate with one another directly, or indirectly perform communication through various relay devices such as Access Point (AP), router or IoT hub.

The remote control apparatus 100 may perform communication with an external electronic apparatus (not shown) such as a smart TV to transmit and receive various data.

Referring to FIG. 1, the remote control apparatus 100 may be embodied as a remote controller. However, the disclosure is not limited thereto. The remote control apparatus 100 may be an electronic apparatus such as a smart phone or a table PC as well as a wearable device such as a smart watch.

The external device 200 may be controlled by the remote control apparatus 100.

When the external device 200 receives an IR signal from the remote control apparatus 100 through an IR receiver, the external device 200 may perform an operation corresponding to the IR signal.

When the external device 200 receives a control signal from the remote control apparatus 100 through wireless communication such as Wi-Fi, ZigBee, Z-Wave or Bluetooth, the external device 200 may perform an operation corresponding to the control signal.

When the external device 200 receives a control signal from the server 300, the external device 200 may perform an operation corresponding to the control signal. The control signal received from the server 300 may be a control signal transmitted from the remote control apparatus 100 to the server 300.

Referring to FIG. 1, the external device 200 may be an air conditioner, a washing machine, a refrigerator, or a robot cleaner. However, it is merely exemplary. The external device 200 may be a TV, a humidifier, a door lock, a dish washer, a security camera, a closed circuit television (CCTV), a security sensor, a light emitting diode (LED), a lamp, a heater, a power meter, a power socket, an electrical outlet, a multi-tap, a personal computer (PC), an IP camera, or the like.

The server 300 may store identification information on the external device 200. The identification information may be various information that can distinguish the external device 200 from another electronic apparatus such as Mac address or serial number.

The server 300 may transmit a control signal to the external device 200. When the server 300 receives a control signal for controlling the external device 200 from the remote control apparatus 100, the server 300 may identify the external device 200 based on the identification information of the external device 200 included in the control signal. The server 300 may transmit a control signal to the identified external device 200.

The server 300 may manage status information of the external device 200. When the server 300 receives status information of the external device 200 from the remote control apparatus 100 and/or the external device 200, the server 300 may manage status information for each external device 200 based on the identification information of the external device 200 included in the status information. The status information may be on and off states of power of the external device 200.

In order to control and manage the external device 200 by the server 300, it is necessary to register the identification information of the external device 200 to the server 300. Hereinafter, a method for registering the identification information of the external device 200 to the server 300 will be described in detail.

Figure 2:
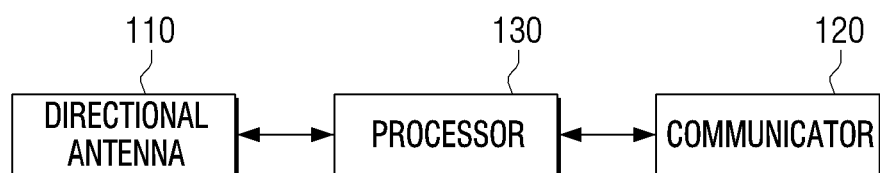
FIG. 2 is a block diagram to explain a remote control apparatus according to an embodiment of the disclosure.

FIG. 2 is a block diagram to explain a remote control apparatus according to an embodiment of the disclosure.

Referring to FIG. 2, a remote control apparatus 100 may include a directional antenna 10, a communicator 120 and a processor 130.

The directional antenna 110 may receive signals. The directional antenna 110 may receive a signal in a specific direction. The signal may be a radio frequency signal (RF signal) radiated from the external device 200.

The directional antenna 110 may be embodied as parallel antennas including two or more antennas. Two or more antennas may be arranged in various methods such as Broadside, end-fire or Chevyshev.

However, the parallel antennas may be an example of the directional antenna 110, but the type of directional antenna 110 will not be limited. The directional antenna 110 may be embodied various types of antennas that can receive a signal in a specific direction.

The directional antenna 110 may be provided on one side surface of the remote control apparatus 100. For example, the directional antenna 110 may be provided on an upper side surface of the remote control apparatus 100.

The communicator 120 may perform communication with the external device 200 and transmit and receive various data.

The communicator 120 may transmit a control signal to control the external device 200 to the external device 200. The control signal may be a signal for controlling on and off states of the power of the external device 200.

The communicator 120 may transmit a signal requesting registration to the external device 200. The external device 200 may transmit a signal requesting registration to the server 300, and the server 300 may register the external device 200 to the server based on a registration request signal.

The communicator 120 may perform communication with various electronic apparatuses other than the external device 200 to transmit and receive various data.

For example, the communicator 120 may transmit identification information of the external device 200 to at least one of the server 300 and an external electronic apparatus such as a smart TV, and receive information on a device registered to the server from at least one of the server 300 and the external electronic apparatus such as a smart TV.

The communicator 120 may include a wireless communication chip, a Wi-Fi chip, a Bluetooth chip, etc.

The processor 130 may control the overall operation of the remote control apparatus 100. The processor 130 may include one or more of a central processing unit (CPU), an application processor (AP), or a communication processor (CP).

Hereinafter, referring to FIG. 3 and FIG. 4, the operation of the processor 130 will be described in detail.

Figure 3:
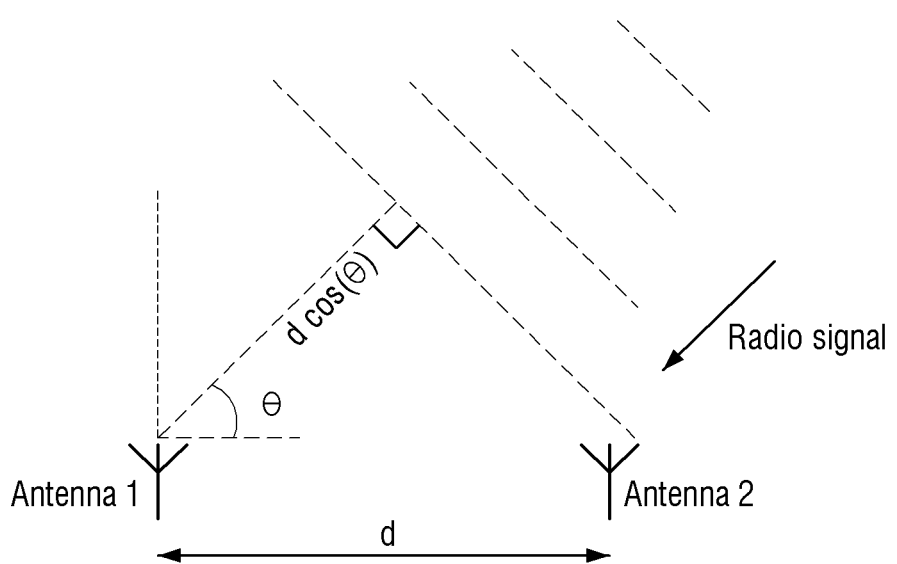
FIG. 3 and FIGS. 4A and 4B are views to explain an example embodiment in which a wireless signal is received from an external device according to an embodiment of the disclosure.

FIG. 3 and FIG. 4 are views to explain an example embodiment in which the remote control apparatus receives a wireless signal from an external device according to an embodiment of the disclosure The processor 130 may receive a wireless signal from the external device 200. The processor 130 may receive an RF signal radiated from the external device 200 through the directional antenna 110.

The wireless signal received at the external device 200 may include identification information of an external device. The identification information may include various information that can distinguish the external device 200 from other electronic apparatuses such as Mac address or serial number.

When the remote control apparatus 100 receives a wireless signal from the external device 20, the processor 130 may identify an angle at which the wireless signal is received.

The processor 130 may identify an angle at which the wireless signal is received using Angle of Arrival (AoA) technique. The Angle of Arrival (AoA) technique may be a positioning method that identifies an angle at which the wireless signal is received by measuring Angle of Arrival (AoA) of the received wireless signal.

For example, referring to FIG. 3, when a wireless signal is received at two directional antennas where a distance therebetween is d, the processor 130 may identify an angle θ of the wireless signal received through each antenna based on equation below.

$$\varphi = (2\pi d \cos(\theta))/\lambda$$

$$\theta = \cos^{-1}((\varphi\lambda)/(2\pi d)) \qquad \text{[Equation]}$$

Where ψ denotes a phase difference, and λ denotes a wavelength.

Figure 4A:
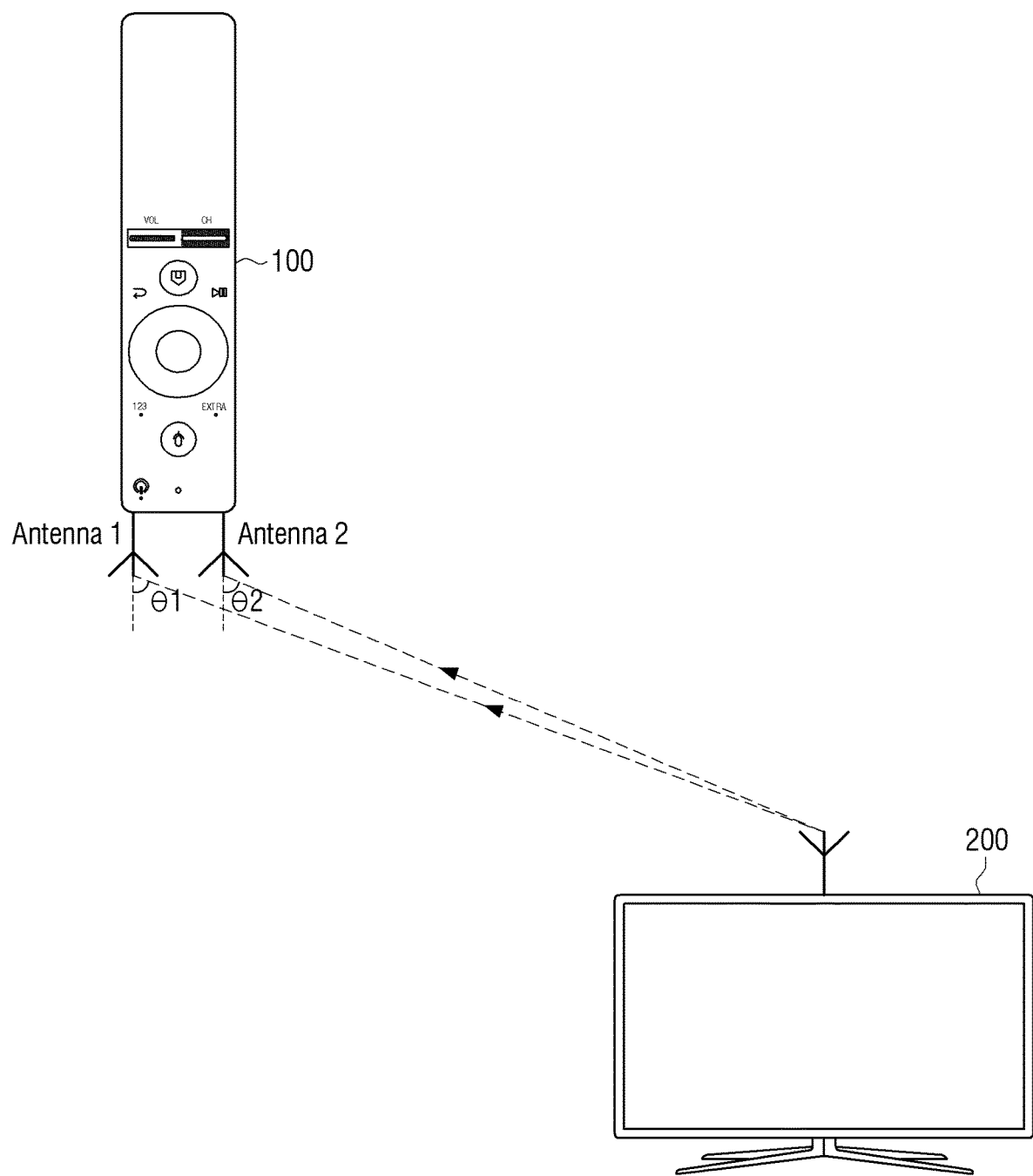
Figure 4B:
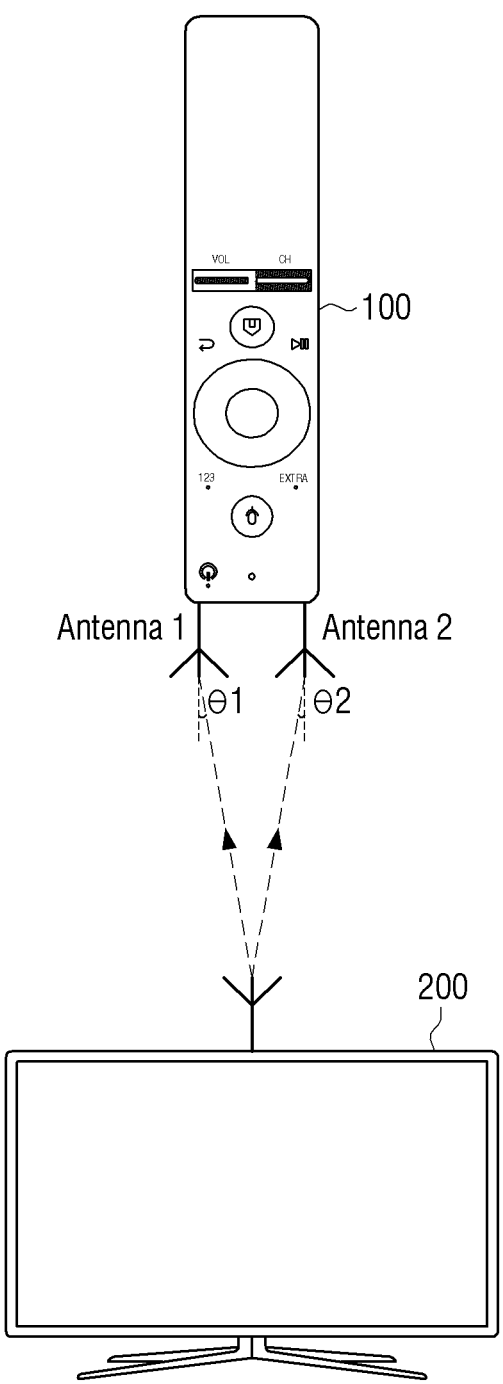

An angle of the wireless signal received from the external device 200 in a state where the directional antenna 110 faces the external device 200 as shown in FIG. 4B may be relatively smaller than an angle of the wireless signal received from the external device 200 in a state where the directional antenna 110 does not face to the external device 200 as shown in FIG. 4A.

However, the disclosure is not limited thereto. The processor 130 may identify an angle of a wireless signal received from the external device 200 through various methods.

For example, the processor 130 may identify an angle of the wireless signal received from the external device 200 thorough an amplitude comparison direction detection method that compares the magnitudes of amplitudes of signals that reach two parallel antennas. For example, when the magnitudes of the amplitudes of the signals that reach a first antenna and a second antenna are the same, the processor 130 may identify an angle at which a wireless signal is received as 0°. That is, the smaller the difference of the magnitudes of the amplitudes of the signals that reach the first antenna and the second antenna, the processor 130 may identify an angle at which the wireless signal is received to be relatively small.

In addition, the processor 130 may identify an angle of the wireless signal received from the external device 200 through a phase difference direction detection method for comparing phases of the signals that reach two parallel antennas. For example, when the phases of the signals that reach the first antenna and the second antenna are the same, the processor 130 may identify an angle at which the wireless signal is received as 0°. The processor 130 may identify the angle at which the wireless signal is receives to be relatively small as the difference between the phases of the signals that reach the first antenna and the second antenna is smaller.

The processor 130 may identify the angle of the wireless signal received from the external device 200 through a time difference direction detection method using a difference of times at which wireless signals reach two parallel antennas. For example, when the wireless signal reaches the first antenna and the second antenna at the same time, the processor 130 may identify the angle at which the wireless signal is received as 0°. The smaller the difference between times at which the signals reaches the first antenna and the second antenna, the processor 130 may identify the angle at which the wireless signal is received to be relatively small.

The processor 130 may obtain identification information of an external device by parsing a wireless signal when the wireless signal received from the external device 200 is within a predetermined range.

The processor 130 may obtain the identification information of the external device by parsing the wireless signal when identifying that the wireless signal is received from the external device 200 in a state where the remote control apparatus 100 faces the external device 200.

A predetermined range may be variously set according to a user command such as in a product launch stage. For example, the predetermined range may be between 0° and 30°.

The identification information may be various information that could distinguish the external device 200 from another electronic apparatus such as Mac address or serial number of the external device 200.

The processor 130 may identify angles of respective signals that reach two parallel antennas through the AoA technique, and as a result of determination, even if phases of the two angles are opposite, and a difference between absolute values is identified to be within a predetermined range, the processor 130 may obtain the identification information of the external device by parsing the wireless signal. This is because it may be considered that the remote control apparatus 100 faces the external device 200.

The processor 130 may identify whether the external device 200 is registered to the server 300 or not based on the identification information of the external device.

The processor 130 may use information on the device registered to the server.

The processor 130 may compare pre-stored information on the device registered to a server with identification information of the external device and identify whether the external device 200 is registered to the server.

The processor 130 may transmit a signal requesting information on the device registered to the server to the server 300, receive the information on the device registered to the server from the server 300, and compare the identification information of the external device with the information to identify whether the external device 200 is registered to the server.

The processor 130 may communicate with an external electronic apparatus (not shown), and may transmit a signal requesting information on the device registered to the server. The external device (not shown) may be capable of performing communication with the server 300, and it may be embodied as a smart TV, etc.

The external electronic apparatus (not shown) may transmit a signal requesting information on the device registered to the server to the server 300, and receive information on the device registered to the server from the server 300. The external electronic apparatus (not shown) may pre-store the information on the device registered to the server.

When the remote control apparatus 100 receives information on the device registered to the server is received from the external electronic apparatus (not shown), the processor 130 may compare the information with the identification information of the external device to identify whether the external device 200 is registered to the server.

When the external device 200 is identified as not being registered to the server, the processor 130 may transmit the signal requesting registration to the external device 200 through the communicator 120.

The external device 200 may transit the signal requesting registration to the server 300, and the external device 200 may register the external device 200 to the server 300 based on the registration request signal.

When the external device 200 is identified as a device that is not registered to the server, the processor 130 may transmit a signal requesting registration of the external device 200 to the server 300, and the server 300 may register the external device 200 to the server 300 based on the registration request signal.

When the external device 200 is identified as not being registered to the server, the processor 130 may transmit a signal requesting registration of the external device 200 to the external electronic apparatus (not shown) through the communicator 120.

The external electronic apparatus (not shown) may transmit the signal requesting registration of the external device 200 to the server 300, and the server 300 may register the external device 200 to the server 300 based on the registration request signal.

The remote control apparatus 100 according to an embodiment of the disclosure may register the external device 200 based on the motion indicating the external device 200 so that a user may intuitively register the external device 200.

In addition, the disclosure does not require a plurality of user inputs for registration of the external device 200 so that user convenience may increase.

Figure 5:
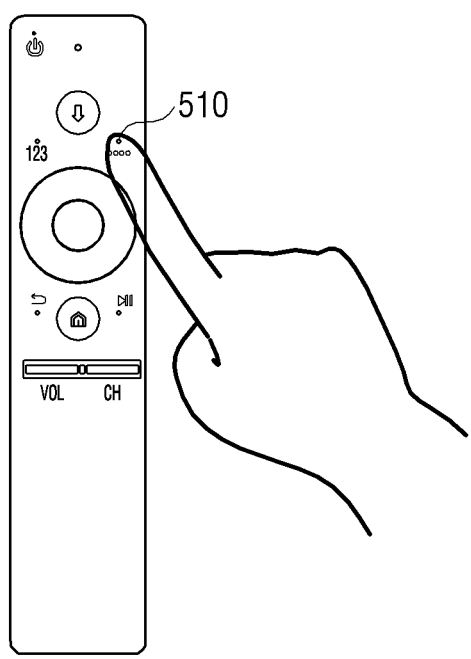
FIG. 5 and FIG. 6 are views to explain an example embodiment for identifying an angle of a wireless signal according to an embodiment of the disclosure.
Figure 6:
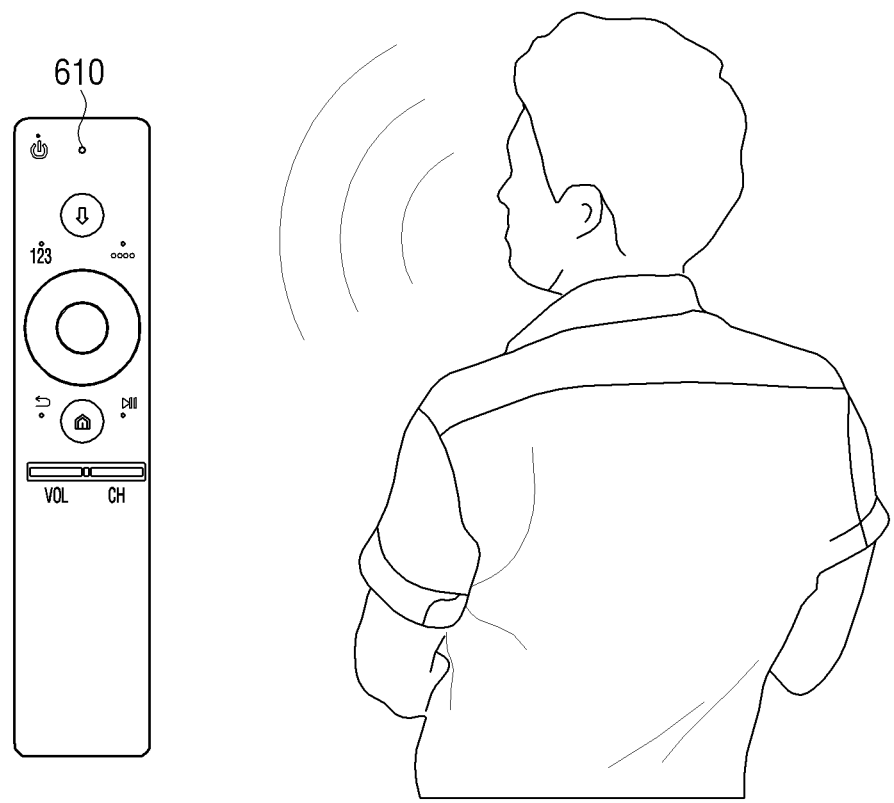

FIG. 5 and FIG. 6 are views to explain an example embodiment for identifying an angle of a wireless signal according to an embodiment of the disclosure.

The external device 200 may radiate wireless signals at a predetermined time interval. The external device 200 may radiate wireless signals at a predetermined time interval when receiving user inputs for radiating wireless signals. For example, when the external device 200 receives a user input for radiating a wireless signal, the external device 200 may radiate a wireless signal at a 4 second interval.

The processor 130 may identify an angle of a wireless signal received from the external device 200, and if the angle is within a predetermined range, the processor 130 may obtain identification information of the external device by parsing the wireless signal.

When a user input is received, the processor 130 may identify the angle of the wireless signal received from the external device 200.

The processor 130 may identify the angle of the wireless signal received from the external device 200 when a user input for registration of the external device 200 is input.

The remote control apparatus 100 may include a button, etc. for the registration of the external device 200. For example, referring to FIG. 5, when the remote control apparatus 100 receives a user input for the registration of the external device 200 through a button 510, the processor 130 may identify the angle of the wireless signal received from the external device 200.

Referring to FIG. 6, the remote control apparatus 100 may include a microphone 610 and when the remote control apparatus 100 receives a user voice for the registration of the external device 200 through the microphone 610, the remote control apparatus 100 may identify the angle of the wireless signal received from the external device 200.

When the remote control apparatus 100 receives a user voice through the microphone, the processor 130 may analyze the user voice through Speech to Text (STT) algorithms, and if the user voice is for the registration of the external device 200, the processor 130 may identify the angle of the wireless signal received from the external device 200.

When there is a user input, the remote control apparatus 100 identifies the angle of the wireless signal received from the external device 200 so that the processor 130 does not have to perform numerous unnecessary calculations.

When the remote control apparatus 100 receives a user input for controlling an external device, the processor 130 may identify an angle of the wireless signal received from the external device 200.

When the remote control apparatus 100 receives a user input for controlling the external device, the processor 130 may transmit an IR signal corresponding to the user input to the external device 200 through the IR, and identify the angle of the wireless signal received from the external device 200.

For example, when the remote control apparatus 100 receives the user input for turning on the power of the external device 200, the processor 130 may transmit the IR signal for turning on to the external device 200 through the IR transmitter, and identify the angle of the wireless signal received from the external device 200.

According to the disclosure, the external device 200 may be naturally registered to the server 200 in the process of controlling the external device 200.

FIG. 7, FIG. 8, FIG. 9, FIG. 10, and FIG. 11 are views to explain an operation of a remote control system according to an embodiment of the disclosure.

When the angle of the wireless signal received from the external device 200 is within a predetermined range, the remote control apparatus 100 may obtain identification information of the external device by parsing the wireless signal.

Figure 7:
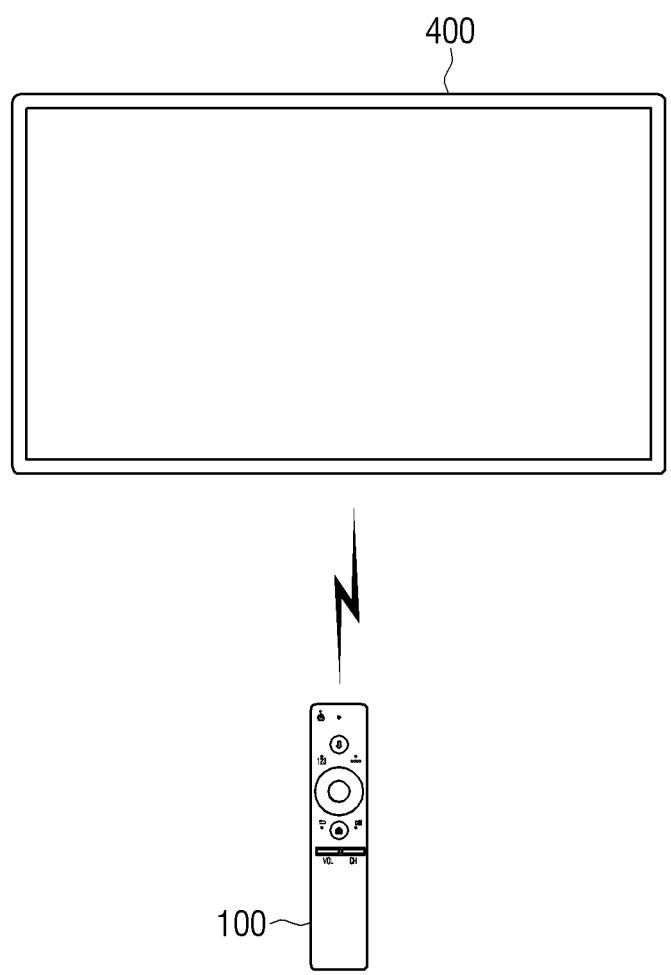

Referring to FIG. 7, the remote control apparatus 100 may transmit the identification information of the external device to an external electronic apparatus 400. The remote control apparatus 100 may transmit the identification information of the external device to the external electronic apparatus 400 through wireless communication such as Wi-Fi or Bluetooth.

The external electronic apparatus 400 may identify whether the external device 200 is registered to the server 300 based on the identification information of the external device 200.

The external electronic apparatus 400 may identify whether the external device 200 is registered to the server 200 by comparing pre-stored information on the device registered to the server with the identification information of the external device 200. The external electronic apparatus 400 may receive the information on the device registered to the server from the server, and compare the received information on the device registered to the server with the identification information of the external device 200 to identify whether the external device 200 is registered to the server 300.

When the external device 200 is identified as not being registered to the server 300, the external electronic apparatus 400 may display a UI for guiding the registration of the external device 200.

For example, referring to FIG. 8, when an air conditioner which is the external device 200 is identified as not being registered to the server 300, the external electronic apparatus 400 may display a UI for guiding the registration of the air conditioner.

When receiving a user input for registering the external device 200, the external electronic apparatus 400 may transmit a signal requesting the registration of the external device 200 to the server 300.

Referring to FIG. 9, when receiving the information on the registration completion of the external device 200 from the server 300, the external electronic apparatus 400 may display a message indicating the registration completion through a display.

A user may control the external device 200 through an IoT related application, and the server 300 may manage status information of the external device 200.

The user may map a new function with a button of the remote control apparatus 100 for each external device 200 through the IoT related application.

For example, referring to FIG. 10, the user may map a channel up/down button of the remote control apparatus 100 with a temperature control function of the air conditioner through the IoT related application. Accordingly, a plurality of different external devices maybe effectively controlled using a single remote control apparatus 100.

It has been described that the external device 200 identifies whether the device is registered to the server 300, but it can be identified by the remote control apparatus 100.

The remote control apparatus 100 may receive information on the device registered to the server 300 from the external electronic apparatus 400, and compare the identification information of the external device with information on the device registered to the server to identify whether the external device 200 is registered to the server 300.

When the external device 200 is identified as not being registered to the server 300, the remote control apparatus 100 may transmit a signal requesting registration to the external device 200.

The remote control apparatus 100 may directly transmit the signal requesting registration of the external device 200 to the server 300, and transmit the signal requesting the registration of the external device 200 to the external electronic apparatus 400. However, the external electronic apparatus 400 may transmit the signal requesting the registration of the external device 200 to the server 300, and the identification information of the external device 200 may be registered to the server 300.

Figure 11:
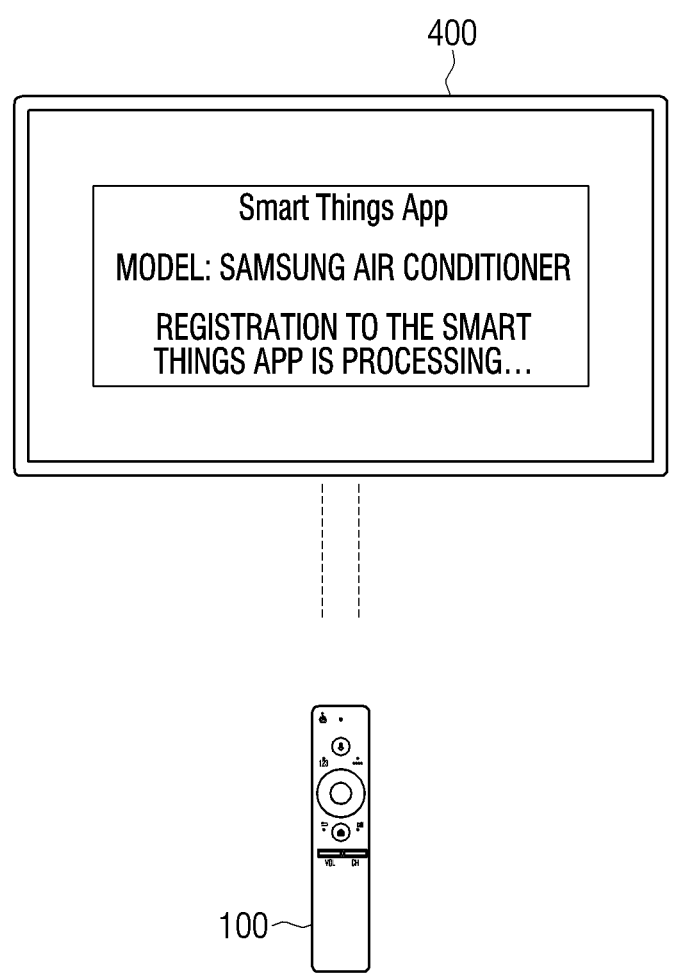

FIG. 11 is a view to explain an example embodiment in which an external device is registered according to an embodiment of the disclosure.

The remote control apparatus 100 may transmit a wireless signal including the identification information of the external device 200 to the external electronic apparatus 400.

In this case, the external electronic apparatus 400 may identify the angle of the wireless signal received from the remote control apparatus 100. The external electronic apparatus 400 may include a directional antenna at its front.

When the angle of the wireless signal received from the remote control apparatus 100 is within a predetermined range, the external electronic apparatus 400 may identify whether the external device 200 is registered to the server 300 based on the identification information of the external device. The angle in the predetermined range may be between 0° to 30°.

For example, referring to FIG. 11, when the external electronic apparatus 400 receives a wireless signal from the remote control apparatus 100 in a state where the remote control apparatus 100 faces the external electronic apparatus 400, the external electronic apparatus 400 may identify whether the external device 200 is registered to the server 300.

When the external device 200 is identified as not being registered to the server 300, the external electronic apparatus 400 may transmit a signal requesting the registration of the external device 200 to the server 300.

Accordingly, the user may easily register the external device 200 to the server 300 through the operation of facing the external device 200 and the operation of facing the external electronic apparatus 400.

Figure 12:
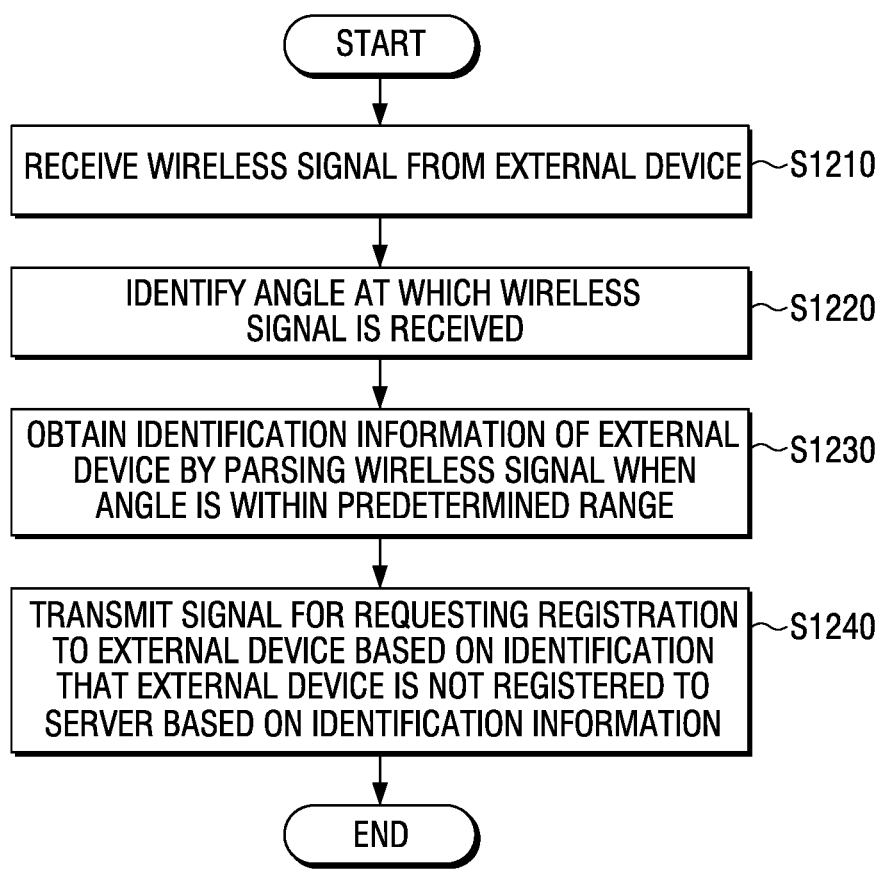
FIG. 12 is a flowchart to explain a method for controlling a remote control apparatus according to an embodiment of the disclosure.

FIG. 12 is a flowchart to explain a method for controlling a remote control apparatus according to an embodiment of the disclosure.

A remote control apparatus may receive a wireless signal from an external device at step S1210. The remote control apparatus may receive an RF signal radiated from the external device through a directional antenna.

The identification information of the external device may be included in the wireless signal received from the external device. The identification information may be various information that can distinguish the external device from another electronic apparatus such as Mac address or serial number.

The remote control apparatus may identify an angle at which the wireless signal is received at step S1220.

To be specific, the angel at which the wireless signal is received may be identified through an amplitude comparison direction detection method for comparing the magnitudes of amplitudes of signals that reach two parallel antennas, a phase difference direction detection method for comparing phases of signals that reach two parallel antennas, or a time difference direction detection method using a difference of times at which the wireless signal reaches the two parallel antennas.

When the angle is within a predetermined range, the remote control apparatus may obtain identification information of the external device by parsing a wireless signal at step S1230.

When the external device is identified as not being registered to the server based on the identification information, the remote control apparatus may transmit a signal requesting registration to the external device at step S1240.

The remote control apparatus may identify whether the external device is registered to the server by comparing the information on the device registered to the server with the identification information of the external device to identify whether the external device is registered to the server. For example, when the identification information of the external device is not included in the information on the device registered to the server, the remote control apparatus may identify that the external device is not registered to the server, and transmit the signal requesting registration to the external device.

The external device may transmit the signal requesting registration to the server, and the server may register the external device to the server based on the registration request signal. The registration request signal may be directly transmitted from the external device to the server or through a replay device such as AP.

Figure 13:
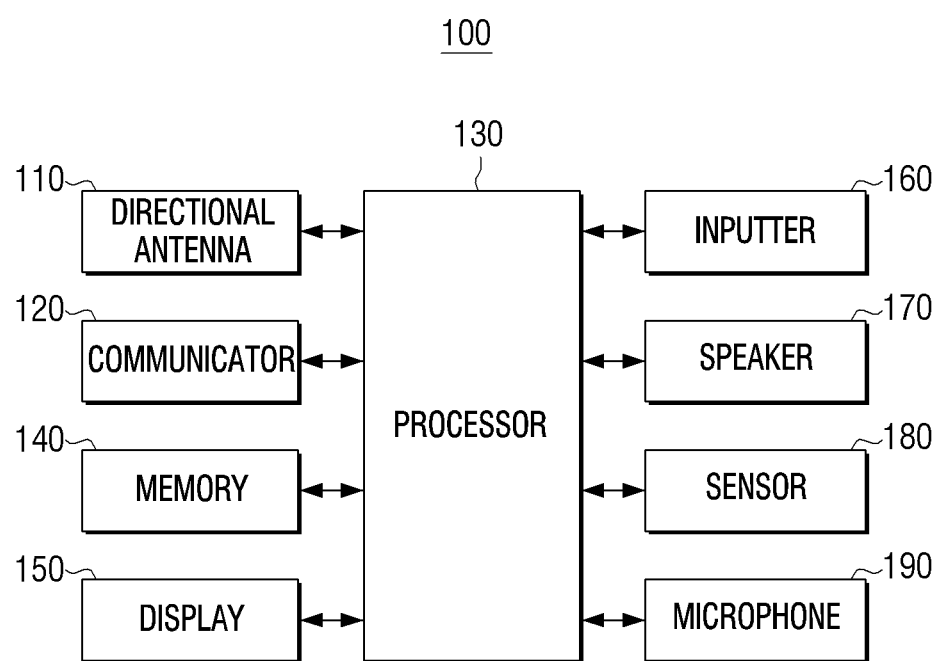
FIG. 13 is a block diagram to explain a remote control apparatus according to an embodiment of the disclosure.

FIG. 13 is a block diagram to explain a remote control apparatus according to an embodiment of the disclosure.

Referring to FIG. 13, a remote control apparatus 100 may include a directional antenna 110, a communicator 120, a memory 140, a display 150, an inputter 160, a speaker 170, a sensor 180, a microphone 190 and a processor 130. The repeated description will be abbreviated or omitted.

The memory 140 may store various modules for driving the remote control apparatus 100. For example, the memory 140 may store software including a base module, a sensing module, a communication module, a presentation module, a web-browser module, and a service module. The base module may be a basic module for processing signals transmitted from each hardware included in the remote control apparatus 100 and transmitting the signals to a next level layer module. The sensing module may be a module for collecting information from various sensors, and analyzing and managing the collected information such as a face recognition module, a voice recognition module, a motion recognition module, an NFC recognition module or an object recognition module. The presentation module may be a module for constituting a display screen, including a UI rendering module for processing UIs and graphics. The communication module may be a module for performing communication with an external device. The web browser module may be a module for executing web browsing and accessing a web-server. The service module may be a module including various applications for providing various services.

The display 150 may display various images. For example, the display 150 may display various UIs including a UI for guiding the registration of the external device 200, a UI for indicating that the registration of the external device 200 is completed.

The display 150 may be implemented as various types of displays such as a light emitting diode (LED), a liquid crystal display (LCD), an organic light emitting diode (OLED) display or a plasma display panel (PDP). The display 150 may further include a driving circuit, which may be implemented in the form of an a-Si TFT, a low temperature poly silicon (LTPS) TFT, an organic TFT (OTFT), etc., a backlight unit, and the like depending on the cases. Meanwhile, the display 150 may be implemented as a touch screen in combination with a touch sensor.

The inputter 160 may receive a user input. For example, the inputter 160 may include a button and a touch screen. The user input may be received for registering the external device 200 through the inputter 160.

The speaker 170 may be configured to output various audio data in which various processing jobs are performed by an audio processor (not shown) such as decoding, amplification and noise filtering. The speaker 170 may output various alarming sounds and voice messages. When the remote control apparatus 100 receives a user input for registering the external device 200, the speaker 170 may output audio if the angle of the wireless signal received from the external device 200 is within a predetermined range or the registration of the external device 200 is completed.

The sensor 180 may detect a motion of the remote control apparatus 100. The sensor 180 may be embodied as an acceleration sensor, a gyro sensor or a geomagnetic sensor to detect the motion of the electronic apparatus 100.

The microphone 190 may receive a user voice. The user voice may be various voices such as a user voice for registering the external device 200.

Figure 14:
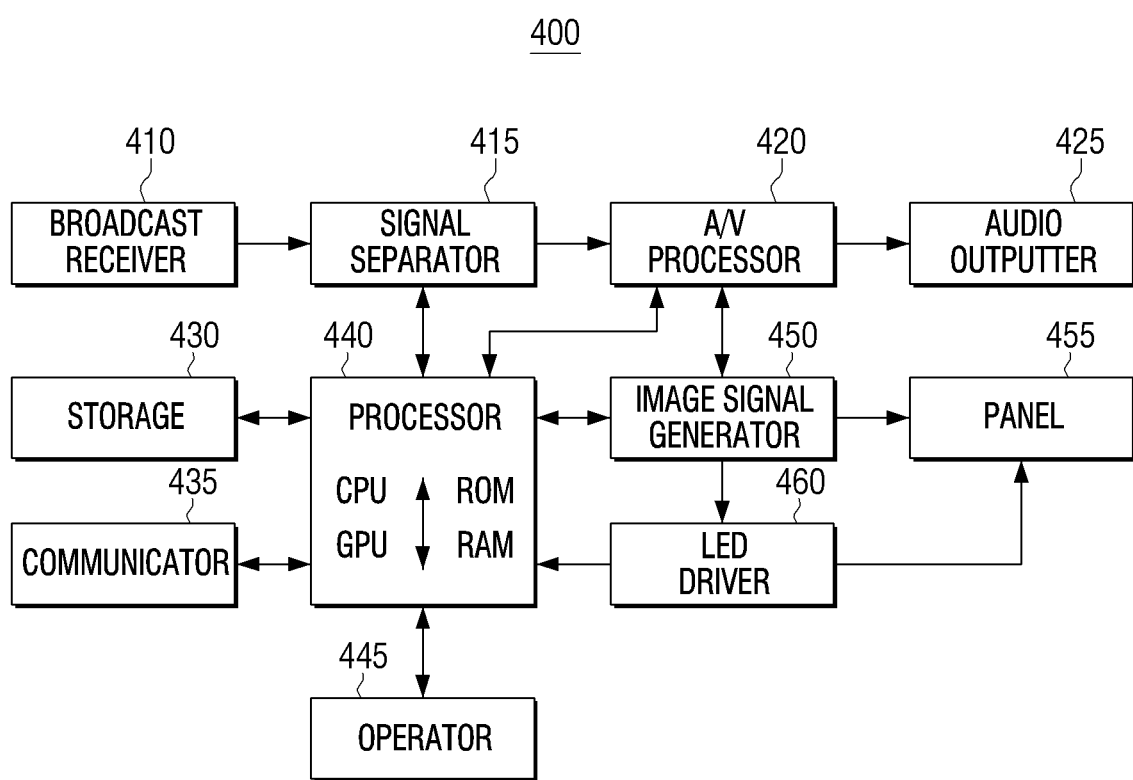
FIG. 14 is a detailed block diagram to explain an external electronic apparatus according to an embodiment of the disclosure.

FIG. 14 is a detailed block diagram to explain an external electronic apparatus according to an embodiment of the disclosure.

Referring to FIG. 14, an external electronic apparatus 400 may include a broadcast receiver 410, a signal separator 415, an A/V processor 420, an audio outputter 425, a storage 430, a communicator 435, an operator 445, a processor 440, an image signal generator 450, a panel 455, and an LED driver 460.

The broadcast receiver 410 may receive a broadcast signal in a wired or wireless manner from a broadcast station or a satellite. The broadcast receiver 410 may be embodied as a tuner.

The signal separator 415 may separate the broadcast signal received from the broadcast receiver 410 into an image signal, an audio signal, and an additional information signal. The signal separator 415 may transmit the image signal and the audio signal to the A/V processor 420.

The A/V processor 420 may perform signal processing such as video decoding, video scaling or audio decoding on image signals and audio signals input from the broadcast receiver 410 and the storage 430. The A/V processor 420 may transmit image signals to the image signal generator 220, and audio signals to the audio outputter 145.

The audio outputter 425 may convert the audio signals received from the A/C processor 420 into sounds and output the sounds through a speaker (not shown).

The image signal generator 450 may generate a Graphic User Interface (GUI). The image signal generator 450 may add the generated GUI to the image received from the A/V processor 420. The image signal generator 450 may transmit an image signal corresponding to the image to which the GUI is added to the panel 455. Therefore, the panel 455 may display various information provided from the external electronic apparatus 400 and images transmitted from the image signal generator 450.

The image signal generator 450 may extract brightness information corresponding to image signals, and generate a dimming signal corresponding to the extracted brightness information. The image signal generator 450 may provide the generated dimming signal to the panel 455. The dimming signal may be a PWM signal. It has been described that the image signal generator 450 generates a dimming signal and provides the dimming signal to the panel 455, but the panel 455 may generate a dimming signal by itself.

The panel 455 may display images. The panel 455 may be implemented as various types of displays such as a liquid crystal display (LCD), an organic light emitting diode (OLED) display or a plasma display panel (PDP). The panel 455 may further include a driving circuit, which may be implemented in the form of an a-Si TFT, a low temperature poly silicon (LTPS) TFT, an organic TFT (OTFT), etc., a backlight unit, and the like. Meanwhile, the panel 455 may be implemented as a touch screen in combination with a touch sensor.

The storage 430 may store image contents. The storage 430 may receive images and image contents in which audio is compressed from the A/V processor 420 ad store the image and the image contents. The storage 430 may be embodied as a hard disk, a non-volatile memory, and volatile memory.

The operator 445 may be embodied as a touch screen, a touch pad, a key button, a key pad, etc.

The communicator 435 may perform communication with various types of external devices according to various types of communication methods. The communicator 435 may include a Wi-Fi chip and a Bluetooth chip. The processor 440 may perform communication with various external devices using the communicator 435. The communicator 435 may perform communication with the electronic apparatus 100.

The external electronic apparatus 400 may further include various external input ports to be connected with various external terminals such as a USB port to which a USB connector is connected, a headset, a mouse, LAN or a DMB chip for receiving and processing a Digital Multimedia Broadcasting (DMB) signal.

Other than the constituent elements in FIG. 14, the external electronic apparatus 400 may further include a power supplier (not shown) and a sensor (not shown). The power supplier may supply a power to each constituent element in the external electronic apparatus 400. The sensing unit may include various sensing devices such as a camera or a motion sensor.

The external electronic apparatus 400 may further include an interface (not shown) that connects to an image supply device such as a set-top box. The interface may be a High-Definition Multimedia Interface (HDMI) input terminal, a component input terminal, an RGB terminal, a DVI terminal, a DP terminal, a Thunderbolt terminal, or a USB input terminal.

The external electronic apparatus 400 may receive signals such as a broadcast signal, an image signal on contents, an audio signal, and a signal related to a background image from an image supply device such as a set-top box through an interface (not shown).

The external electronic apparatus 400 may display an image through the panel 455 by processing an image signal received from an image supply device through the interface, and convert the received audio signal into sound to output the sound through the speaker (not shown).

The processor 440 may control the overlap operation of the external electronic apparatus 400. Referring to FIG. 14, the processor 440 may include CPU, GPU, ROM, RAM, etc.

The processor 440 may control the image signal generator 450 and the panel 455 so that an image according to a control command received through the operator 445 may be displayed.

According to the above-described various embodiments, it is possible to register a device to be registered through an operation of pointing a remote control apparatus toward the device to be registered. Therefore, a user may intuitively register the device to be controlled.

In addition, product cost can be reduced because a display for displaying a separate UI screen is not required, and there is no need for executing a plurality of user inputs for registering a device to be controlled. Therefore, user convenience can be enhanced.

The methods according to various example embodiments of the disclosure may be embodied in the form of software or application that can be installed on a conventional electronic apparatus.

The methods according to various example embodiments of the disclosure may be embodied as software upgrade or hardware upgrade with respect to a conventional electronic apparatus.

In addition, various example embodiments of the disclosure can be performed through an embedded server, or an external server of at least one of an electronic apparatus or a display device.

A non-transitory computer readable medium in which a program for performing a control method of a remote control device is stored may be provided.

The non-transitory computer readable medium refers to a medium that stores data semi-permanently rather than storing data for a very short time, such as a register, a cache, and a memory, and is readable by an apparatus. Specifically, the above-described various applications or programs may be stored in a non-transitory computer readable medium such as a compact disc (CD), a digital versatile disk (DVD), a hard disk, a Blu-ray disk, a universal serial bus (USB) memory stick, a memory card, and a read only memory (ROM), and may be provided.

Although embodiments have been shown and described, it will be appreciated by those skilled in the art that changes may be made to these embodiments without departing from the principles and spirit of the disclosure. Accordingly, the scope of the invention is not construed as being limited to the described embodiments, but is defined by the appended claims as well as equivalents thereto.

What is claimed is:

1. A remote control apparatus comprising:
   a directional antenna;
   a communicator; and
   a processor configured to:
      based on a wireless signal being received from an external device through the directional antenna, identify an angle at which the wireless signal is received,
      based on the angle being within a predetermined range, obtain identification information of the external device by parsing the wireless signal, and
      based on the obtained identification information, control the communicator to transmit a signal to an electronic device for registering the external device to a server,
   wherein the processor is further configured to identify the angle based on a first signal received from the external device and a second signal received from the external device.

2. The apparatus as claimed in claim 1, wherein the wireless signal comprises the identification information of the external device.

3. The apparatus as claimed in claim 1, wherein the processor is further configured to:
   identify whether the external device is a device registered to the server based on information on a device registered to the server and the identification information of the external device, and
   based on identifying that the external device is not registered to the server, control the communicator to transmit the signal for requesting registration of the external device to the electronic device.

4. The apparatus as claimed in claim 3, wherein the information on the device registered to the server is received from at least one of the server and the electronic apparatus.

5. The apparatus as claimed in claim 1, wherein the processor is further configured to, based on a user input for registering the external device being received, identify the angle at which the wireless signal is received.

6. The apparatus as claimed in claim 1, further comprising:
   an IR transmitter,
   wherein the processor is further configured to, based on a user input for controlling the external device being received, identify the angle at which the wireless signal is received.

7. The apparatus as claimed in claim 1, wherein the identification information includes information on Mac address of the external device.

8. The apparatus as claimed in claim 1, wherein the directional antenna includes two parallel antennas, and
   wherein the first signal and the second signal received from the external device are signals reached the two parallel antennas.

9. A method for controlling a remote control apparatus, the method comprising:
   receiving a wireless signal from an external device;
   identifying an angle at which the wireless signal is received;
   based on the angle being within a predetermined range, obtaining identification information of the external device by parsing the wireless signal; and
   based on the obtained identification information, transmitting a signal to an electronic device for registering the external device to a server,
   wherein the identifying of the angle comprises identifying the angle based on a first signal received from the external device and a second signal received from the external device.

10. The method as claimed in claim 9, wherein the wireless signal comprises the identification information of the external device.

11. The method as claimed in claim 9, wherein the transmitting comprises:
   identifying whether the external device is a device registered to the server based on information on a device registered to the server and the identification information of the external device, and
   based on identifying that the external device is not registered to the server, transmitting the signal for requesting registration of the external device to the electronic device.

12. The method as claimed in claim 11, wherein the information on the device registered to the server is received from at least one of the server and the electronic apparatus.

13. The method as claimed in claim 9, wherein the identifying comprises: based on a user input for registering the external device being received, identifying the angle at which the wireless signal is received.

14. The method as claimed in claim 9, wherein the identifying comprises: based on a user input for controlling the external device being received, transmitting an IR signal corresponding to the user input to the external device, and identifying the angle at which the wireless signal is received.

15. The method as claimed in claim 9, wherein the identification information includes information on Mac address of the external device.

16. The method as claimed in claim 9, wherein the remote control apparatus includes a directional antenna, and the directional antenna includes a first parallel antenna, and a second parallel antenna, and
   wherein the first signal received from the external device is a signal received through the first parallel antenna and the second signal received from the external device is a signal received through the second parallel antenna.

* * * * *